US006913045B2

(12) United States Patent
Fantino et al.

(10) Patent No.: US 6,913,045 B2
(45) Date of Patent: Jul. 5, 2005

(54) PROCESS FOR SELECTIVITY LACING FILAMENTS ON MULTIDIMENSIONAL TEXTILE PREFORMS AND DEVICE FOR PRACTICING THE SAME

(75) Inventors: Lucien Fantino, Merignac (FR); Didier Glayal, Le Haillan (FR); François Monget, Merignac (FR)

(73) Assignee: EADS Launch Vehicles, Paris Cedex 16 (FR)

( * ) Notice: Subject to any disclaimer, the term of this patent is extended or adjusted under 35 U.S.C. 154(b) by 210 days.

(21) Appl. No.: 10/455,620

(22) Filed: Jun. 6, 2003

(65) Prior Publication Data

US 2003/0226246 A1 Dec. 11, 2003

(30) Foreign Application Priority Data

Jun. 6, 2002 (FR) ............................................. 02 06987

(51) Int. Cl.[7] ............................................. D03D 41/00
(52) U.S. Cl. ..................... 139/11; 139/DIG. 1; 442/203; 442/205
(58) Field of Search ............................. 139/11, DIG. 1, 139/384 R; 442/203, 205

(56) References Cited

U.S. PATENT DOCUMENTS

| 3,525,785 | A | * | 8/1970 | Fairbanks ................... 264/103 |
|---|---|---|---|---|
| 3,824,939 | A | | 7/1974 | Spanel et al. |
| 4,615,256 | A | * | 10/1986 | Fukuta et al. .................. 87/33 |
| 4,984,502 | A | * | 1/1991 | Spain et al. ...................... 87/8 |
| 5,091,246 | A | * | 2/1992 | Yasui et al. .................. 442/205 |
| 5,246,040 | A | * | 9/1993 | Barwick et al. ............ 139/459 |
| 5,263,516 | A | * | 11/1993 | van Schuylenburch ..... 139/411 |
| 5,327,621 | A | | 7/1994 | Yasui et al. |
| 5,614,282 | A | * | 3/1997 | Bono et al. ................. 428/116 |
| 5,767,023 | A | | 6/1998 | Chauvelier et al. |
| 5,791,384 | A | * | 8/1998 | Evans ..................... 139/383 R |
| 5,924,459 | A | | 7/1999 | Evans |
| 6,129,122 | A | * | 10/2000 | Bilisik .......................... 139/11 |
| 6,325,109 | B1 | * | 12/2001 | Podesta' ...................... 139/11 |
| 6,338,367 | B1 | * | 1/2002 | Khokar ........................ 139/11 |
| 6,431,222 | B1 | * | 8/2002 | Khokar ................... 139/383 R |
| 6,470,916 | B1 | * | 10/2002 | Uchida et al. ................ 139/11 |
| 6,581,646 | B2 | * | 6/2003 | Dewispelaere .............. 139/455 |
| 6,843,280 | B2 | * | 1/2005 | Cahuzac et al. .............. 139/11 |

* cited by examiner

Primary Examiner—John J. Calvert
Assistant Examiner—Robert H. Muromoto, Jr.
(74) Attorney, Agent, or Firm—Young & Thompson

(57) ABSTRACT

A process for selectively lacing filaments on multi-dimensional textile preforms made of rods, the rods are displaced by the filament and pressed vertically downwardly by a needle with an open eye which, after passing through the piece to be laced, is opened at an insertion station for the filament to receive the filament, then is raised to pass the filament through the space freed by the rod.

20 Claims, 4 Drawing Sheets

PROCESS FOR SELECTIVITY LACING FILAMENTS ON MULTIDIMENSIONAL TEXTILE PREFORMS AND DEVICE FOR PRACTICING THE SAME

The present invention relates to the production of textile preforms for high performance composite materials and more precisely the weaving of multidimensional textile preforms on rods.

These preforms comprise fibers, continuous or not, oriented in at least three directions called in conventional manner X, Y or Z according to the system of orthogonal Cartesian coordinates.

In a first instance, filaments are deposited along the directions X and Y, the direction Z being temporarily materialized by metallic rods or the like. In a second instance, the rods are replaced by filament in the course of an operation now called lacing.

To this end, in known devices for weaving this type of preform, each rod is pressed by a needle of the type with an open eye which thus passes through all the thickness or height of the piece to be laced to eject the rod below this latter. The needle at the outlet of the piece is captured by a member called a trough associated with a system of opening the eye of the needle. The filament to be laced is thus presented into the eye of the needle which is then raised and thus draws a double filament taken into the hook of the needle and which takes the place that has been freed by the ejected rod.

Existing lacing devices permit the emplacement of only a single type of filament.

When a change of the lacing filament is necessary, one must stop the device, manually feed the new filament and if needed make adaptive adjustments.

This manner of proceeding is clearly burdensome and is not viable in the case of industrial mass production comprising frequent changes of the lacing filament. These changes can relate to the chemical composition of the filament, for example to alternate carbon fibers and Kevlar fibers, or on the diameter of the filament, to adapt it for example to the geometry of the piece to be made, as is the case particularly in thick members of revolution.

It should be said that the existing lacing devices are caused to operate in a particularly confined space in which the little room available leads designers to produce a device which is effective but limited. Thus, if the filament is to be passed between filaments X and Y already in place, the available surface being of the order of square millimeters, the emplacement of the filament in the eye of the needle takes place in the interval between the lower surface of the piece to be laced and the basket that recovers the rods, which must be located as near as possible (several centimeters) so as to preserve the geometry of the piece to make the following piece. Space is further reduced by the fact that a filament is laced between rods already in place.

This confined space requires having a device which opens the needle, then passes through it the filament to be laced with a swinging movement in the direction of the filament of at least 90°.

The object of the present invention is to provide means adapted to permit an automatic change of the lacing filament, without having to stop the lacing device nor to make new adaptive adjustments.

To this end, the invention has for its object a selective lacing process for filaments on multidimensional textile preforms provided on rods, in which the rods are replaced by the filament, the rods being pressed vertically downwardly by a needle of the open eye type which, after passing through the piece to be laced and ejecting the rod, is open at a so-called insertion station for the filament to receive the filament to be laced, then is raised to pass the filament through the space freed by said rod, characterized by the following steps:

first there is prepared a plurality of different filaments disposed in ready position in parallel, the desired filament is selectively brought facing said filament insertion station, the necessary length of the selective filament is pre-delivered, the filament is presented and brought into the eye of the needle such that the hook of the needle is located substantially in the middle of the length of the filament to be laced, the needle and the double filament are raised and, if desired, at the end of raising the needle the filament is cut in line with said insertion station.

The invention also has for its object a lacing device for practicing the above process, comprising a lacing needle with an open eye, movably vertical so as to press and expel from the piece to be laced successively a set of rods, supply means for the lacing filament and an insertion station for the lacing filament into the eye of the needle in the lowered position of this latter, comprising capturing the needle and opening the eye, characterized in that it comprises:

a filament supply for the needle constituted by a plurality of filament distributors arranged in parallel so as each to present to said insertion station a filament orthogonally to the axis of the needle, means for moving a filament to each distributor, constituted by as many flexible tubes as distributors, pneumatic propulsion means adapted to move the filament within each tube, a device for pre-delivering the length of the filament, interposed between each tube and a storage bobbin for the filament, and means for collecting the filament to be laced, disposed at the insertion station facing the selected distributor and adapted to draw the filament such that the hook of the needle is located substantially in the middle of the length of the filament to be laced and to apply to it a predetermined adjustable tension.

According to one embodiment, said supply comprises a movable belt to which are fixed said distributors each constituted by securement means for the end of one of the filament supply tubes, the outlet openings of said tubes being movable in a plane parallel to the axis of the needle, and means for moving the belt in one direction or the other so as to bring any one of said openings to the height of the insertion station for the filament in the eye of the needle.

The pickup means, at the insertion station, for the filament to be laced and to be brought to a position appropriate to the length of the filament to be laced, are perfectly constituted by a tube connected to a vacuum source sucking in the filament and adapted to hold it under a certain tension, said tube being disposed opposite the selected filament distributor relative to the needle and facing said distributor.

Such a lacing device permits not only lacing different types of filament, selectively, automatically and without having to stop the lacing operations nor to perform new adjustments with each change, but also ensures a regular lacing of the double filament without slipping in the hook, thanks to the pre-delivery device of the length of filament necessary and the balanced placement of this length of filament on opposite sides of the hook of the needles.

Other characteristics and advantages will become apparent from the description which follows, of an embodiment of the device of the invention, which description is given solely by way of example and with respect to the accompanying drawings, in which.

Figure 1:
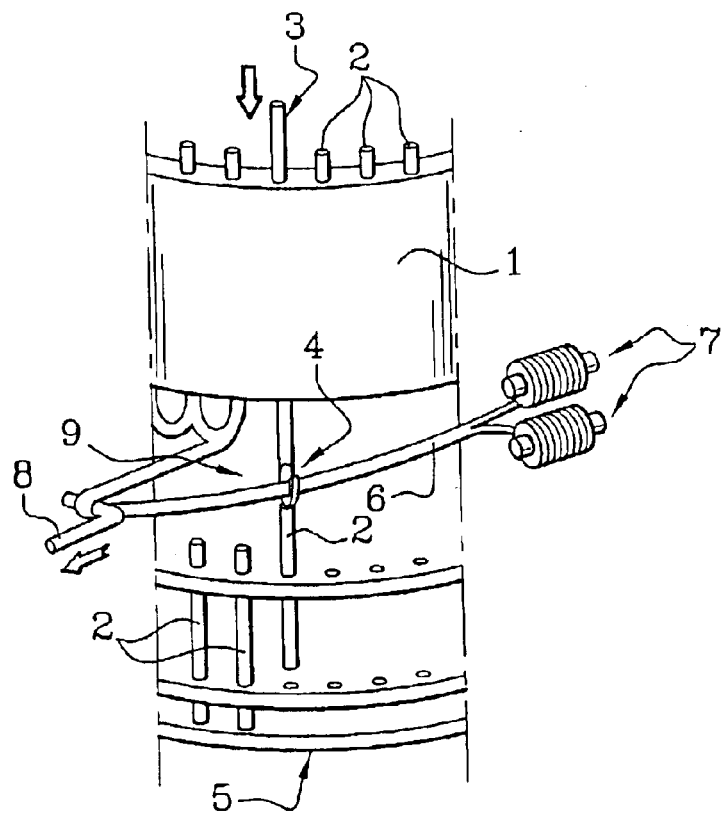
FIGS. 1 and 2 show schematically the principle of lacing.
Figure 2:
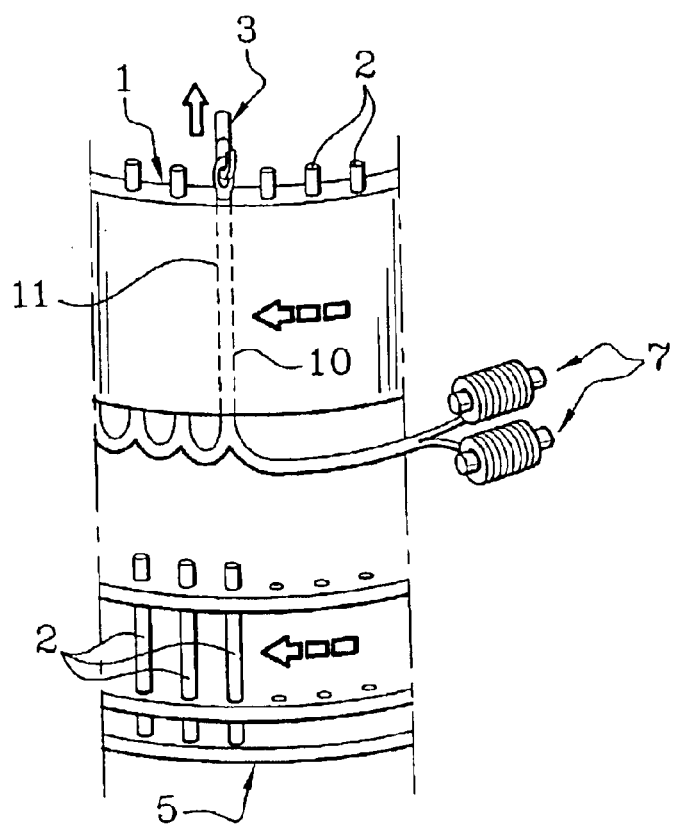

FIGS. 1 and 2 shows the lacing principle of a cylindrical three-dimensional textile form constituted by filaments in the X, Y and Z directions. After the emplacement of the X and Y filaments, the piece 1 to be laced is traversed vertically by parallel rods 2 occupying the positions of the future Z filaments.

A lacing needle 3, of the type with an open eye 4, is brought above and successively facing the different rods 2 so as to eject them downwardly in the direction of a cylindrical recovery rack 5, the support of the piece and the rack 5 being driven in rotation stepwise in synchronism about a common vertical axis.

The filament to be laced, for example a mesh 6 formed by the junction of several filaments unwound from bobbins 7 disposed on a frame (not shown) is gripped and moved horizontally by a puller 8 and in a so-called insertion station 9 of the filament in the needle 3 located in the interval between the piece 1 and the rack 5, in the lower position of the needle 3, as shown in FIG. 1, after complete extraction of the rod 2.

In this insertion station 9, the needle 3, in a conventional manner, is grasped by a device (not shown) called a trough arranged in line with the device, also well known and not shown, for opening the eye 4 of the needle. The filament 6 to be laced is placed above the open eye and the needle 3 rises with the double filament taken into the hook of the needle, the two portions of the filament, namely the upstream portion turned toward bobbins 7 and the downstream portion turned toward the filament Z which has been previously laced, being symbolized respectively at 10 and 11 in FIG. 2.

Figure 3:
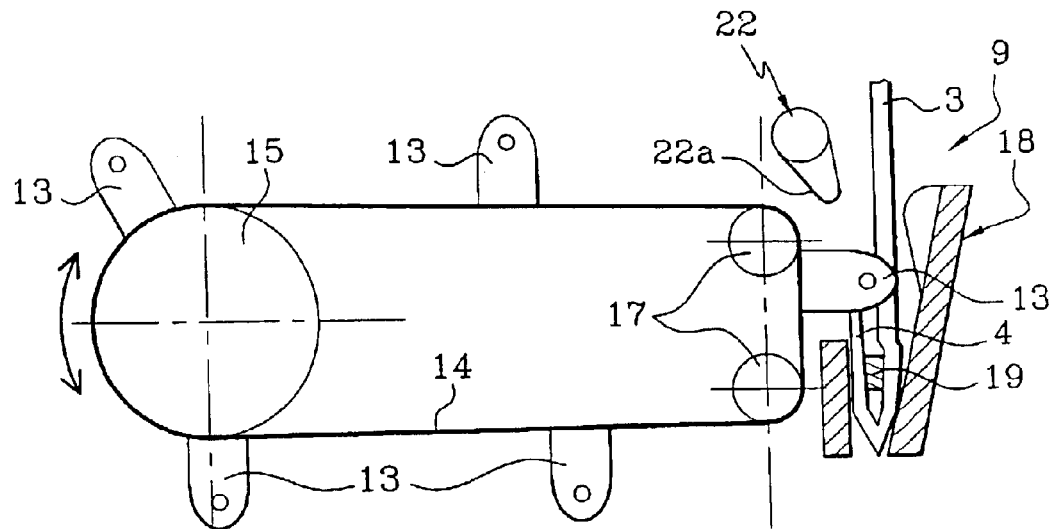
FIG. 3 is a schematic side elevational view of a lacing filament supply according to the invention.
Figure 4:
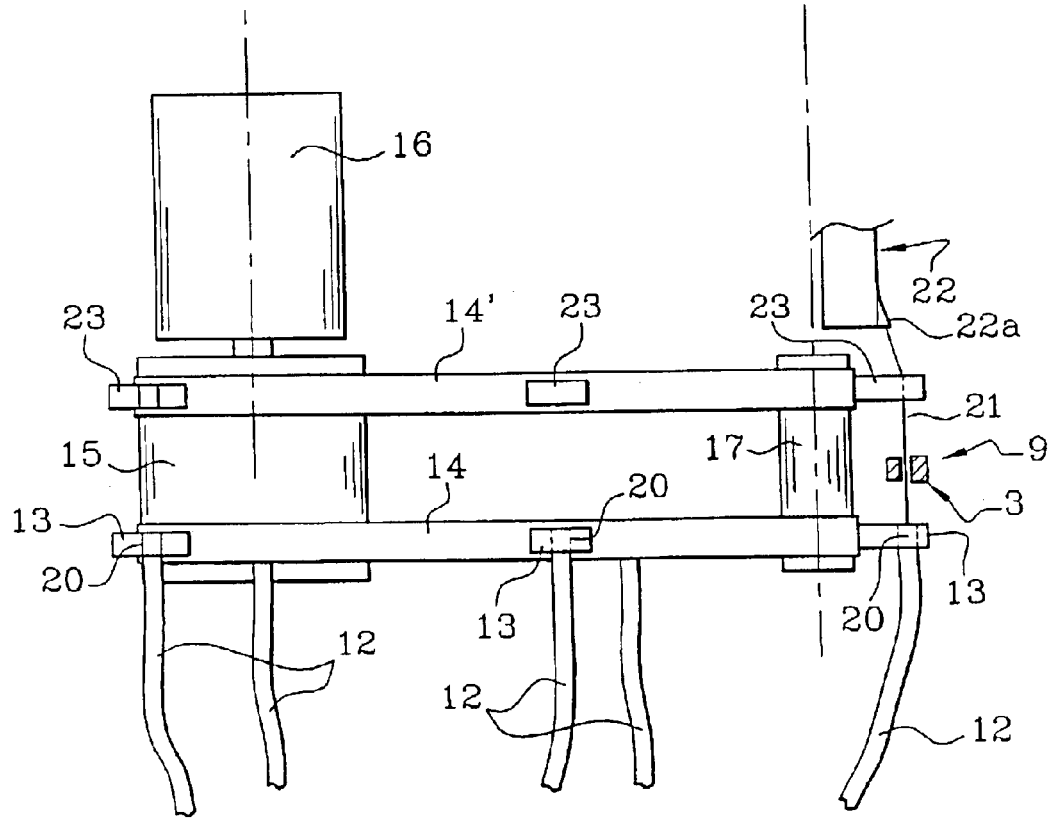
FIG. 4 is a top view of the device of FIG. 3.

FIGS. 3 and 4 show a supply according to the invention for selectively bringing to the insertion station 9 a lacing filament selected from a plurality of different filaments distributed among respective bobbins (not shown) carried by a frame.

To this end, each filament is brought by a flexible guide tube 12, to a distributor 13 fixed on the external surface of a toothed belt 14 disposed in a loop whose plane is vertical and parallel to the axis of the lacing needle 3.

By way of example, five distributors 13 are shown in FIGS. 3 and 4 as being regularly spaced along the belt 14, which is driven by a pulley 15 moved by a motor 16, controlled as to position, beneath the insertion station 9, and passes over two free pulleys 17 located in said station 9 and defining a portion of the path of the vertical belt 14 at the height of the needle 3.

When the needle 3 is in its lower position, in the insertion station 9, it is engaged in a pickup trough schematically shown at 18 and an opener schematically shown at 19 (not shown in FIG. 4) to penetrate the needle to open the eye 4. In FIG. 3, a distributor 13 is located in line with the outlet of said eye 4.

The distributors 13 are single pieces for securement at the end 20 of a tube 12, the openings of the different tubes being thus aligned in a same vertical plane and turned to the same side.

When a distributor 13 is in the insertion position for a lacing filament, shown at 21 in FIG. 4, this distributor is located facing a device for picking up the filament, symbolized at 22 and located on the other side of the needle 3.

The device 22 for picking up the filament is, according to the invention, constituted by a profiled tube for sucking the filament 21. It thus has a suitable length and is connected to a source of vacuum (not shown).

The tube 22 preferably comprises an opening profiled in the sense that it has an end defining a nose 22a (FIG. 3) directed downwardly in the direction of the eye 4 of the needle.

The tube 22 occupies a position slightly offset above the distributor 13 in the presentation position (FIG. 3) of the filament above the eye 4 of the needle and, this for a reason which will be explained later during the description of the operation of the supply.

Preferably, the tube 22 is provided with a constriction for adjusting the suction and as a result the tension exerted on the sucked filament, the portion of the filament temporarily stored in this tube 22 being connected to the previously laced filament Z, of course unless it is a first lacing with the help of a new filament.

Similarly, preferably, the supply can be provided with a centering and lowering device for the filament facilitating and rendering more precise the positioning of the filament 21 at the station 9.

This device can be constituted, as shown in FIG. 4, by a second belt 14' parallel to the first and passing over the same pulleys 15, 17.

The belt 14' carries, facing each distributor 13, a centering and lowering guide 23 formed for example by a simple finger accompanying the filament 21 in synchronism with the associated distributor 13.

Figure 6:
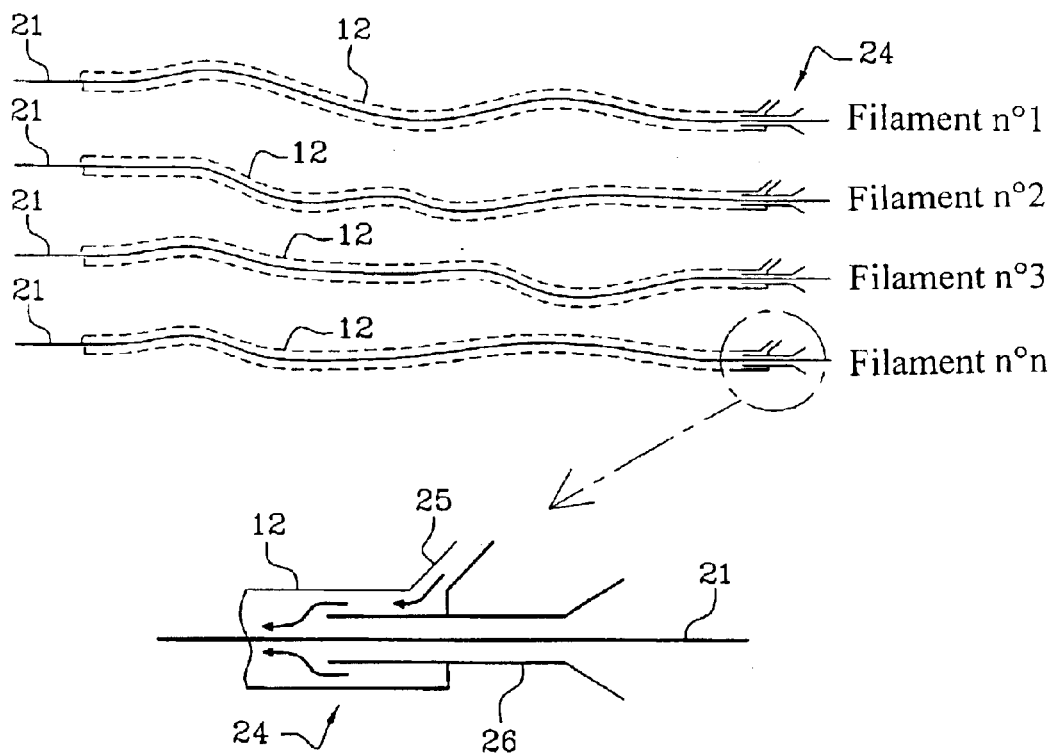
FIG. 6 shows schematically a preferred embodiment of the filament feed means to the supply.

In FIG. 6 are shown four of the tubes 12 for supplying four different lacing filaments. On the left portion of FIG. 6, the tubes 12, shown interrupted, are each connected to a distributor 13 of the supply of FIG. 4, but at their other end, each tube 12 is provided with a blowing device 24 shown enlarged into a loop. This end of the tubes 12 is fixed, whilst the other is obviously movable.

At this fixed end, the tube 12 is closed, supplied with air under pressure by a lateral conduit 25 and prolonged axially by a tube 26 of reduced diameter, forming a funnel for introduction of the filament 21 into the tube 12. This filament 21 comes from a pre-delivery device shown in FIG. 7, there being such a device associated with each filament.

The pre-delivery device comprises a cylinder 27 motor-driven in rotation and facing which is disposed a free roller 28 movable between two positions, one (28') spaced from this cylinder 27 and the other (28) engaged to pinch the filament 21; the respective inlet and outlet guides 29 and 30 being provided on opposite sides of the cylinder 27 to guide the filament 21 which can be held in position and tensioned, during emplacement of the filament in the hook of the needle by a controlled filament brake schematically shown at 31.

The operation of the lacing device shown and described above is the following.

First of all, each type of lacing filament that is to be used for lacing a predetermined pieced 1 is manually emplaced.

To this end, the different filaments are supplied each in a tube 12 to the distributors 13. The device is thus ready to operate.

Let it be supposed that there is to be made a cylindrical preform according to the lacing principle shown in FIGS. 1 and 2, with the help of a lacing head comprising a system carrying the lacing needle (3), the means for moving the needle, the means (18) for picking up the needle and for opening (19) the eye, as well as the device for presenting the filament (FIG. 3) according to the invention.

In a first step, the presence of a metallic rod 2 is detected by said head, in the direction Z to be laced, this detection effecting the selection of the desired lacing filament.

Figure 5A:
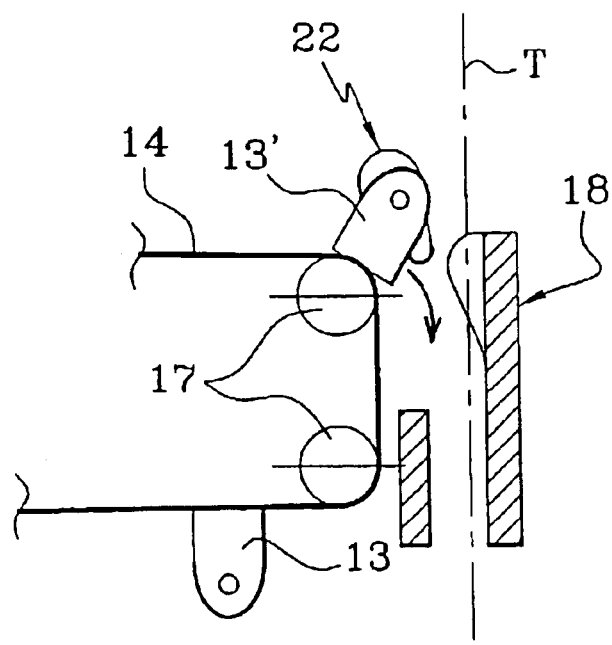
FIGS. 5a and 5b show the emplacement of the selected filament in the eye of the needle by the device of FIGS. 3 and 4.

The motor 16 of the supply of FIGS. 3 and 4 is then actuated so as to bring the distributor 13 relating to the selected filament 21 into the position shown at 13' in FIG. 5a, a so-called pre-positioning of the distributor to take over the filament, at the height of the pickup tube 22.

In a second step, the needle 3 comes into contact with the rod to be ejected and pushes the rod.

At the end of the descent of the needle, the latter is located in the insertion station 9. It is in a conventional way picked up by the trough 18 and its eye is opened by the opener 19.

Figure 7:
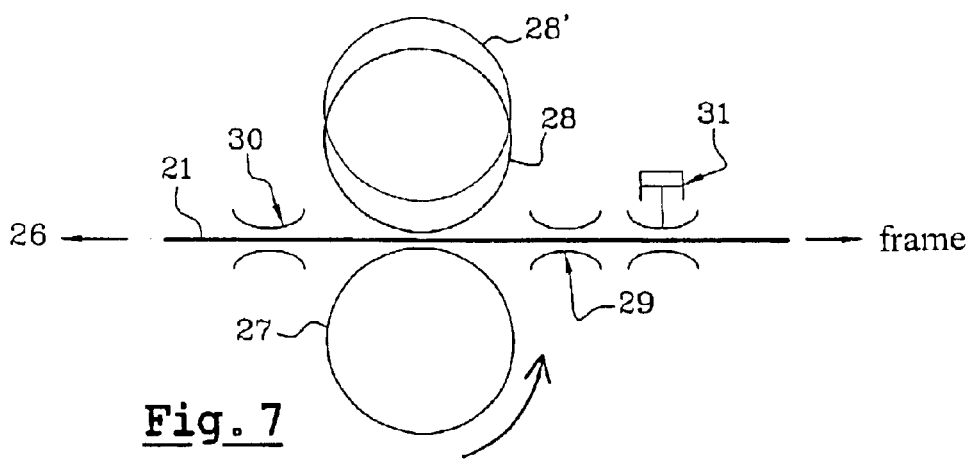
FIG. 7 shows an embodiment of the pre-delivery device for the filament.

During this step, the necessary length of filament to be laced is pre-delivered by the device of FIG. 7.

This necessary length of filament is slightly greater than the height of the piece.

To this end, the roller 28 is pressed against the motorized cylinder 27 which is driven for a predetermined number of turns corresponding to the desired length. This length of delivered filament is pushed by the pre-delivery device of FIG. 6 in the direction of the tube 22. To this end, air under pressure is sent through the selected conduit 25 to force the filament 21 to circulate in the tube 12 of the filament in question.

At the other end of the tube, the filament 21 is taken in charge by suction by the pickup tube 22 and the length of filament destined for lacing, namely a little more than twice the height of the piece because the lacing filament is doubled, is stored on opposite sides of the supply, one half being in the tube 22 and the other half in the tube 12.

Figure 5B:
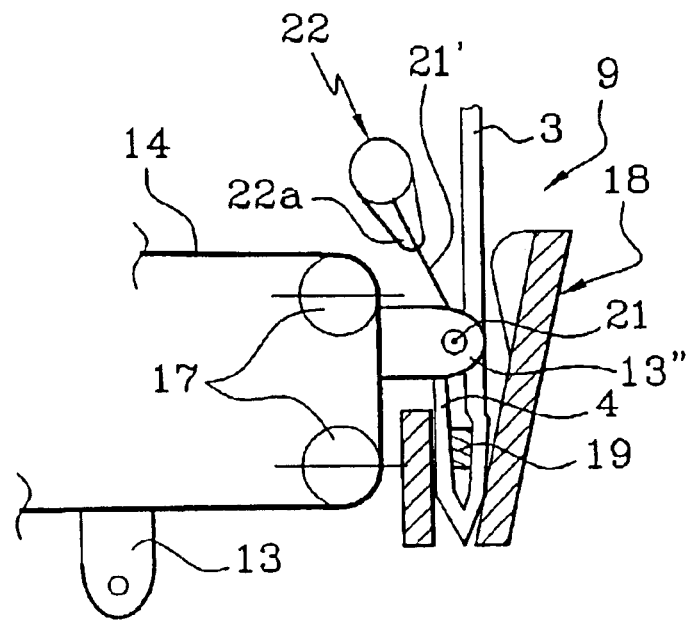

Then the eye of the needle 3 being open, the distributor 13' with its filament 21 is brought to the position 13" of FIG. 5b, for presenting the filament 21 in line with the open eye. The portion of the filament presented above the open eye is horizontal, this portion being stretched between the distributor 13" and its associated centering and lowering guide 23. The portion of the filament (designated 21' in FIG. 5b) located between the guide 23 and the end of the pickup tube 22 is channeled by the nose 22a of said tube 22.

The tube 22 is slightly offset relative to the path, symbolized at T in FIG. 5a, of the rod-needle assembly, so that the emplacement of the filament 21 in the tube 22 will not be disturbed by the descent of said rod-needle assembly.

The filament 21 is held by the tube 22 under slight adjustable tension.

In addition to this tensioning of the filament, the pickup 22 ensures the aspiration of the febrils and cutting waste (its element 21 being constituted by a mesh of dry oiled filaments) thereby fulfilling a health and safety function for the operators.

At the insertion station 9, the needle 3 is picked up by the trough 18 and its eye is opened by the opener 19 in a conventional manner and which is not needed to be described here.

Then, the needle 3 rises while folding the filament 21 in two, which is drawn by the hook without sliding of the filament on this latter. Thus, the tensions in the filament on opposite sides of the hook are balanced. On the frame side, this tension is that of unwinding the filament from the frame, the roller 28' being separated and the brake 31 inactive. This tension is balanced by the tension exerted by the pickup tube during rising of the needle. At the end of rising, the needle returns downwardly into the piece to free the filament from the eye.

In the case in which the following lacing filament is different, the filament 21 is sectioned, once the needle is totally risen, in the station 9, above the trough 18, with the help for example of a conventional diamond disk system (not shown) turning at high speed and retractable to leave the free piece necessary for the following lacing.

When the following lacing is carried out with the same filament 21, the supply undergoes only a slight displacement between the above position for pre-positioning in which it operates, during descent of the needle 3, the pre-delivery of the necessary length of filament, then the correct position for placement of the filament 21 facing the open eye.

The pre-delivery is carried out in the same manner as the preceding lacing, with this difference: the portion of the filament corresponding to a height of the piece is disposed in the tube 22 by being folded on itself, because this portion of the filament is connected to the filament previously laced.

The end of the cycle of the second lacing is identical to that described with respect to the first lacing.

Because the ends of the tubes 12 on the pre-delivery side are fixed, the belts 14, 14' are driven in one direction and then in the other to avoid rolling up the tubes 12 on themselves.

The insertion of the filament 21 in the hook of the needle 3 takes place during the vertical movement of the distributor 13 circulating between the two free pulleys 17.

The motor 16 is preferably driven so as to impress on the distributor the movements of disengagement which may be necessary.

The belts 14, 14' are preferably of flexible material.

The presser rollers 28 are selectable by programmation to choose the filament which must be pre-delivered. The braking devices 31 are actuable independently and permit guiding the filaments in position and stretching the selected filament during the emplacement of the filament on the hook of the needle as well as during cutting of the filament during change of filament or at the end of lacing.

The device for moving by pneumatic means the filaments in the tubes 12 and 22 permits lacing of fragile filaments such as filaments of high modulus carbon or ceramic base fibers.

The process according to the invention has been described in the framework of providing a cylindrical preform, but it is evident that it is equally applicable to the production of a "cubicle" preform, in which case the rod carrying rack is fixed, as well as the preform, the lacing head and the mechanism for presenting the filaments being themselves moved along the X and Y axes. As a modification, the lacing head and the supply mechanism are fixed and it is the preform itself which moves.

What is claimed is:

1. Process for selectively lacing filaments on multi-dimensional textile preforms provided by rods (2), in which the rods are replaced by the filament, the rods being pushed vertically downwardly by a needle (3) of the type having an open eye which, after passing through the piece to be laced (1) and ejection of the rod (2) is opened at a so-called filament insertion station (9) to receive the filament (21) to be laced, then is raised to pass the filament into the space freed by said rod, characterized by the following steps:

there are first prepared a plurality of different filaments (21) disposed in a ready position in parallel, the desired filament (21) is selectively brought facing said filament insertion station (9), the necessary length of the selected filament is pre-delivered, the filament (21) is presented and moved into the eye (4) of the needle (3) such that the hook of the needle is located substantially in the middle of the length of the filament to be laced, the needle (3) is raised and the double filament (21) and, if desired, at the end of rising of the needle the filament is cut in line with said insertion station (9).

2. Lacing device to practice the process according to claim 1, comprising a lacing needle (3) with an open eye (4), movably vertical so as to push end eject from the piece to be laced (1) successively a set of rods (2), the supply means for the lacing filament and an insertion station (9) for the lacing filament in the eye of the needle in the lower position of this latter, comprising a pickup device (18) for the needle (3) and for opening (9) the eye (4), characterized in that it comprises:

a supply for the filament in the needle (3) constituted by a plurality of filament distributors (13) arranged in parallel and movable so as to present to said insertion station (9) each a filament (21) orthogonally to the axis of the needle (3), means for supplying a filament (21) to each distributor (13), constituted by as many flexible tubes (12) as distributors, means (25) for pneumatic propulsion adapted to move the filament (21) to the interior of each tube (12), a device (27, 28) for pre-delivering the length of the filament, interposed between each tube (12) and a storage winding for the filament, and means (22) for picking up the filament to be laced (21), disposed at the insertion station (9) facing the selected distributor (13) and adapted to draw the filament such that the hook of the needle (3) is located substantially at the middle of the length of filament to be laced and to apply to it a predetermined adjustable tension.

3. Lacing device according to claim 2, characterized in that said supply comprises a movable belt (14) on which are fixed said distributors (13) each constituted by means for securing the end of filament supply tubes (12), the outlet openings of said tubes (12) being movable in a plane parallel to the axis of the needle (3) and said means (16) for moving the belt (14) in one direction or the other so as to supply any one of said openings at the height of said insertion station (9) with filament in the eye of the needle (3).

4. Lacing device according to claim 3, characterized in that said belt (14) is positioned in line with the insertion station (9) such that the distributors (13) move parallel to the axis of the needle (3) and at the height of the eye (4) of this latter.

5. Lacing device according to claim 3, characterized in that the supply comprises a second belt (14') disposed parallel to the first (14) and carrying centering and lowering guides (23) in the form of a finger facing each of the distributors (13), the two belts (14, 14') being driven in synchronism.

6. Lacing device according to claim 2, characterized in that said pneumatic propulsion means for the filament (21) in each tube (12) are constituted by a conduit (25) supplying with air under controlled pressure the tube at one end of this latter, this end being provided with a tube (26) for introduction of the filament (21) at the origin of said pre-delivery means.

7. Lacing device according to claim 2, characterized in that said pre-delivery device for the filament (21) is constituted by a power-driven cylinder (27) associated with a free roller (28) that is retractable, for pressing the filament against said cylinder.

8. Lacing device according to claim 7, characterized in that upstream of the pre-delivery device is arranged a controlled filament brake (31).

9. Lacing device according to claim 2, characterized in that said means for picking up the filament (21) is constituted by a tube (22) connected to a source of vacuum.

10. Lacing device according to claim 9, characterized in that said tube (22) is a tube with a profiled orifice (22a) for guiding the filament, provided with a constriction for adjustment or the suction.

11. Lacing device according to claim 4, characterized in that the supply comprises a second belt (14') disposed parallel to the first (14) and carrying centering and lowering guides (23) in the form of a ringer facing each of the distributors (13), the two belts (14, 14') being driven in synchronism.

12. Lacing device according to claim 3, characterized in that said pneumatic propulsion means for the filament (21) in each tube (12) are constituted by a conduit (25) supplying with air under controlled pressure the tube at one end of this latter, this end being provided with a tube (26) for introduction of the filament (21) at the origin of said pre-delivery means.

13. Lacing device according to claim 4, characterized in that said pneumatic propulsion means for the filament (21) in each tube (12) are constituted by a conduit (25) supplying with air under controlled pressure the tube at one end of this latter, this end being provided with a tube (26) for introduction of the filament (21) at the origin of said pre-delivery means.

14. Lacing device according to claim 5, characterized in that said pneumatic propulsion means for the filament (21) in each tube (12) are constituted by a conduit (25) supplying with air under controlled pressure the tube at one end of this latter, this end being provided with a tube (26) for introduction of the filament (21) at the origin of said pre-delivery means.

15. Lacing device according to claim 3, characterized in that said pre-delivery device for the filament (21) is constituted by a power-driven cylinder (27) associated with a free roller (28) that is retractable, for pressing the filament against said cylinder.

16. Lacing device according to claim 4, characterized in that said pre-delivery device for the filament (21) is constituted by a power-driven cylinder (27) associated with a free roller (28) that is retractable, for pressing the filament against said cylinder.

17. Lacing device according to claim 5, characterized in that said pre-delivery device for the filament (21) is constituted by a power-driven cylinder (27) associated with a free roller (28) that is retractable, for pressing the filament against said cylinder.

18. Lacing device according to claim 6, characterized in that said pre-delivery device for the filament (21) is constituted by a power-driven cylinder (27) associated with a free roller (28) that is retractable, for pressing the filament against said cylinder.

19. Lacing device according to claim 3, characterized in that said means for picking up the filament (21) is constituted by a tube (22) connected to a source of vacuum.

20. Lacing device according to claim 4, characterized in that said means for picking up the filament (21) is constituted by a tube (22) connected to a source of vacuum.

* * * * *